United States Patent
Reznic et al.

(10) Patent No.: US 12,131,267 B2
(45) Date of Patent: *Oct. 29, 2024

(54) AUTOMATED TRAINING, RETRAINING AND RELEARNING APPLIED TO DATA ANALYTICS

(71) Applicant: Bitvore Corp., Los Angeles, CA (US)

(72) Inventors: Mirella Reznic, Irvine, CA (US); Greg Bolcer, Yorba Linda, CA (US); Anthony Gullotta, Carlsbad, CA (US)

(73) Assignee: Bitvore Corp., Los Angeles, CA (US)

( * ) Notice: Subject to any disclaimer, the term of this patent is extended or adjusted under 35 U.S.C. 154(b) by 902 days.

This patent is subject to a terminal disclaimer.

(21) Appl. No.: 16/997,532

(22) Filed: Aug. 19, 2020

(65) Prior Publication Data

US 2022/0058500 A1  Feb. 24, 2022

(51) Int. Cl.
*G06N 5/04* (2023.01)
*G06N 5/043* (2023.01)
*G06N 20/00* (2019.01)

(52) U.S. Cl.
CPC ............. *G06N 5/043* (2013.01); *G06N 20/00* (2019.01)

(58) Field of Classification Search
CPC ............................... G06N 5/043; G06N 20/00
See application file for complete search history.

(56) References Cited

PUBLICATIONS

Nabil, Mahmoud "LABR: A Large Scale Arabic Sentiment Analysis Benchmark" arXiv [published 2015] [retrieved May 2023] <URL: https://doi.org/10.48550/arXiv.1411.6718> (Year: 2015).*

Scholz, M., & Klinkenberg, R. (Oct 2005). An ensemble classifier for drifting concepts. In Proceedings of the Second International Workshop on Knowledge Discovery in Data Streams (vol. 6, No. 11, pp. 53-64). Porto, Portugal. (Year: 2005).*

Mario Cataldi et al. "Emerging topic detection on Twitter based on temporal and social terms evaluation" (MDMKDD '10). Association for Computing Machinery, New York, NY, USA, Article 4, 1-10. https://doi.org/10.1145/1814245.1814249 (Year: 2010).*

Y. Lu, H. Wang, S. Landis and R. Maciejewski, "A Visual Analytics Framework for Identifying Topic Drivers in Media Events" in IEEE Transactions on Visualization & Computer Graphics, vol. 24, No. 09, pp. 2501-2515, 2018. doi: 10.1109/TVCG.2017.2752166 (Year: 2018).*

Donghwa Kim et al. "Multi-co-training for document classification using various document representations: TF-IDF, LDA, and Doc2Vec" Information Sciences, vol. 477, 2019, pp. 15-29, https://doi.org/10.1016/j.ins.2018.10.006. (Year: 2019).*

(Continued)

*Primary Examiner* — Van C Mang
(74) *Attorney, Agent, or Firm* — McAndrews, Held & Malloy, Ltd.

(57) ABSTRACT

Systems and methods are provided for data analysis that may be initialized via self-identification from customers and continually trained automatically thereafter. A plurality of records are partitioned into a plurality of tagged sets. The plurality of tagged sets comprises a positive set, a negative set, and a neutral set. A model is generated according to a first portion of the plurality of tagged sets. Then, an initial fit of the model is evaluated according to a second portion of the plurality of tagged sets. The model may then be adjusted according to the initial fit of the model. A final fit of the adjusted model is evaluated according to a third portion of the plurality of tagged sets.

18 Claims, 4 Drawing Sheets

(56) References Cited

PUBLICATIONS

Glowacka, Dorota, et al. "Scinet: A system for browsing scientific literature through keyword manipulation." Proceedings of the companion publication of the 2013 international conference on Intelligent user interfaces companion. 2013. https://dl.acm.org/doi/10.1145/2451176.2451199 (Year: 2013).*

* cited by examiner

| Themes | | | | |
|---|---|---|---|---|
| 1 - Economic | 2 - Political | 3 - Financial | 4 - Business | 5 - Society / Tech |
| • Inverted Yield Curve<br>• Fed Interest Rate Cuts<br>• Minimum wage increase<br>• Recession / Inflation<br>• Tariffs / Trade Wars<br>• Sovereign Credit Ratings<br>• BRIC / Emerging Markets<br>• Unemployment Trends<br>• Housing Prices | • Brexit<br>• EU Elections<br>• US Elections<br>• North Korean Crisis<br>• Middle East Tensions<br>• US Immigration<br>• New Treaties / Conventions<br>• New Entrants / Leavers to Unions | • Credit Spreads<br>• LIBOR vs. SOFR<br>• Currency Crisis<br>• Treasury / Mortgage Interest Rates<br>• Debt Crisis<br>• Sub-prime Lending | • Data Privacy – GDPR<br>• Data Privacy – CCPA<br>• New Regulations<br>• New Tax Rules<br>• Copyright and Patent Infringements<br>• Trump - Volfefe Index<br>• Workforce Reskilling<br>• Cybersecurity / Fraud<br>• Gender Pay Gap<br>• Board Diversity | • US Gun Violence<br>• Freedom of Speech<br>• Millennial Trends -<br>• Portfolio incomes<br>• Strikes & Protests<br>• AI, ML and IoT<br>• Blockchain / Cryptocurrencies<br>• 5G<br>• Climate Change<br>• War / Conflict<br>• Natural Disasters & Accidents<br>• Terrorism<br>• Epidemics |

FIG. 1

AUTOMATED TRAINING, RETRAINING AND RELEARNING APPLIED TO DATA ANALYTICS

FIELD

Aspects of the present disclosure relate to the creation of and maintenance of data analysis models. More specifically, certain embodiments of the disclosure relate to a system and method for automated training, retraining and relearning applied to data analytics.

BACKGROUND

Conventional approaches for data analytics are traditionally limited to static models, with little or no automated retraining and relearning.

Further limitations and disadvantages of conventional and traditional approaches will be apparent in view of the present disclosure.

BRIEF SUMMARY

A system and/or method are provided for automated training, retraining and relearning applied to data analytics as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

While certain examples of themes are provided herein, the automated training, retraining and relearning may be applied to any desired type of classification. Themes (or other types of classification) may be recognized manually or automatically to build a database for the data analytics.

BRIEF DESCRIPTION OF SEVERAL VIEWS OF THE DRAWINGS

FIG. 1 is table of themes, in accordance with an example embodiment of the disclosure.

DETAILED DESCRIPTION

FIG. 1 is table of themes, in accordance with an example embodiment of the disclosure. Themes represent like or similar concepts, keywords, issues or subject matter. Themes may (or may not) refer to a company or organization. Themes may also refer to a meaningful or financially impactful event. Themes are generally grouped into topics. Each theme may also be arranged hierarchically with sub-themes that are more specific. The themes in FIG. 1 are organized into categories by way of example and not limitation.

Figure 2:
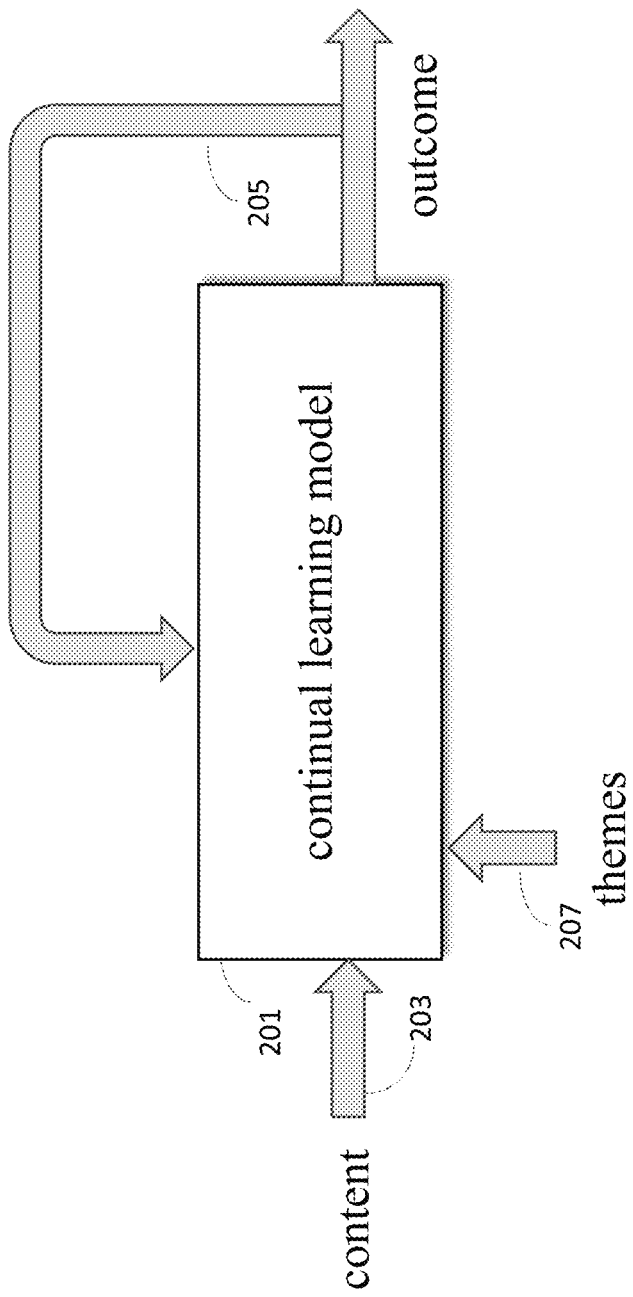
FIG. 2 illustrates a system for automated training, retraining and relearning applied to data analytics, in accordance with an example embodiment of the disclosure.

FIG. 2 illustrates a system for automated training, retraining and relearning applied to data analytics, in accordance with an example embodiment of the disclosure. Within each theme, a system may search for trending news or other sources of information on the web, and/or other sources and other forms of information, using key phrase extraction and a magnitude of mentions over time, or the system may use other methods or criteria. A continual learning model 201 may automatically learn from continuous stream of content 203 flowing through the system, such that the system may be tuned based on outcome 205. The continual learning model 201 feeds the output of a machine learning model back into the training set for a new model creation as a means to adapt to changing inputs and content.

The entire process of training the system to recognize a new theme may be user-guided. The system may also be trained to recognize new themes using the automated training, retraining, and relearning described herein in this disclosure. Users may train the system by providing new themes 207 that they want to follow, or the system may automatically suggest possible themes that it recognizes in the dataset(s) being analyzed. The system for data analysis in FIG. 2 may comprise a non-transitory computer readable medium having stored thereon software instructions. When performed by a processor, the software instructions are operable to perform the process and method described in further detail below.

Figure 3:
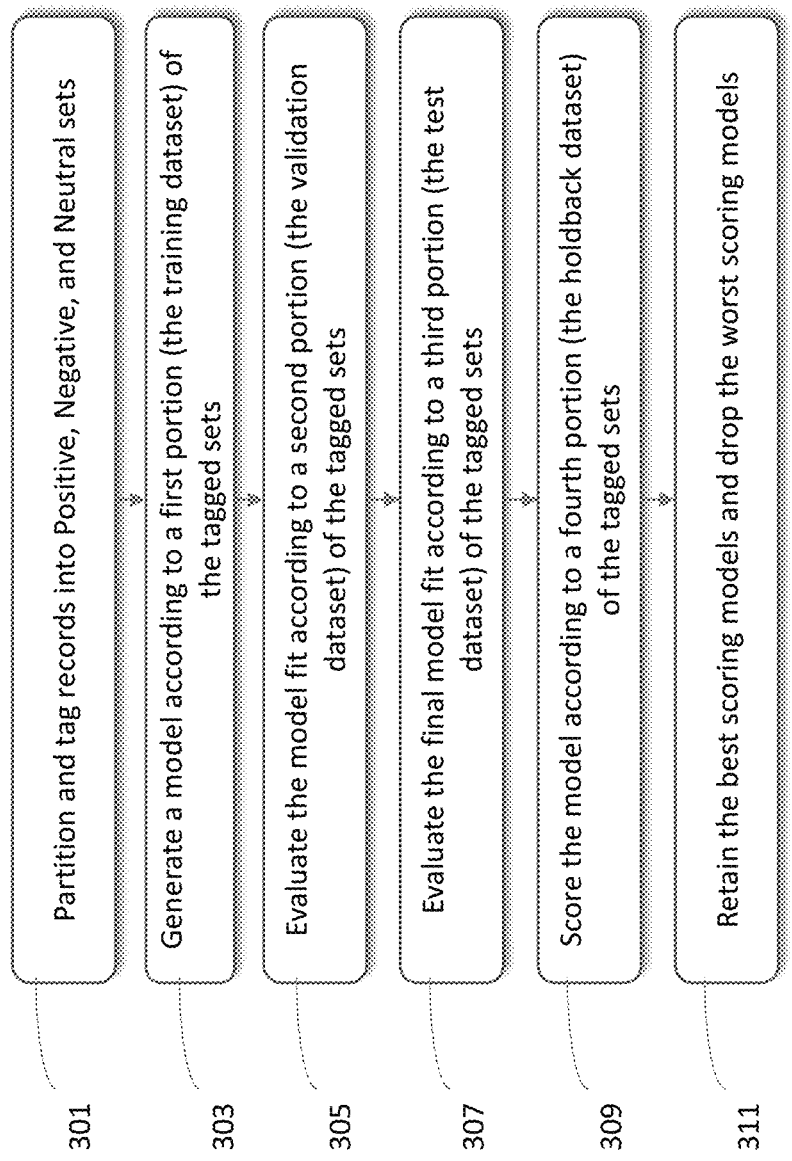
FIG. 3 illustrates a flow diagram of a process for automated training, retraining and relearning applied to data analytics, in accordance with an example embodiment of the disclosure.

FIG. 3 illustrates a flow diagram of a process for automated training, retraining and relearning applied to data analytics, in accordance with an example embodiment of the disclosure.

A plurality of records are partitioned into a plurality of tagged sets at 301. The plurality of tagged sets comprises a positive set, a negative set, and a neutral set. A model is generated according to a first portion of the plurality of tagged sets at 303. Then, an initial fit of the model is evaluated according to a second portion of the plurality of tagged sets at 305. The model may then be adjusted according to the initial fit of the model. A final fit of the adjusted model is evaluated according to a third portion of the plurality of tagged sets at 307. The adjusted model may be scored and fine-tuned according to a fourth portion of the plurality of tagged sets at 309. A score of the adjusted model may be compared to a score of a different model at 311. According to this comparison, the better-scoring model(s) may be retained, and the worse-scoring model(s) may be dropped.

The adjusted model(s) may be used to determine a level of content related to a theme. The level of content is the amount of records identified based on the tradeoff of precision and recall where precision is an ability to accurately identify things without false positives and recall is not missing anything that properly should be identified. If an uptick over time in the level or amount of content related to the theme is detected, one or more key phrases (where the key phrase may comprise one or more words) may be extracted from an article of content or other piece of information associated with the theme. A phrase/word is considered "key" if a frequency or other attribute of the phrase/word exceeds a threshold. The extracted key phrase/word may be compared to the positive set. The extracted key phrase/word may also be added to the positive set according to this comparison.

Datasets (e.g., sets of content) may be partitioned in a guided and/or manual way as in 301. For each theme, three sets of content may be tagged in the system. The first set may comprise a set of example articles that represent the theme— these are positive examples. Applicable records may be assigned to a positive training set. The second set may comprise a list of things that are themes, but do not match that specific theme—these are negative examples. Records that are not applicable may be assigned to a negative training set. The third set may comprise a set of content that does not represent a theme at all—these are neutral examples.

From the three sets of tagged records, a model may be generated based on an analysis of the text in each record and across a first set of records, the "training dataset", as in 303. The model may include the frequency or other attribute of terms and the global frequency or other attribute of terms in the positive set and negative set, as well as other analyses of the data. Some portion of each set of tagged records may be set aside for validation, as in 305. For example, 80% of each set of tagged records may be portioned for training (the "training dataset") and also for validation (the "validation dataset"), and the remaining 20% may be used for testing (the "testing dataset"). Other portioning between training, validation and testing are also possible. The sample of data used to fit the model, i.e. set up the initial parameters of the model, is the training dataset.

The sample of data used to provide an unbiased evaluation, in 305, of a model fit on the training dataset while tuning model hyper-parameters is the validation dataset. The evaluation becomes more biased as skill on the validation dataset is incorporated into the model configuration.

The sample of data used to provide an unbiased evaluation, in 307, of a final model fit on the training dataset is the test dataset.

A percentage of the overall tagged records (e.g., 15%) may be used to generate a precision score (according to correct positives) and a recall score (according to incorrect negatives) as in 309. The remaining percentage of the overall tagged records (e.g., 5%) not used in the training, validation, or testing datasets may be a holdback set. The holdback set may be used after iterating through one or more combinations of the other sets, for final testing to verify that the model is ready for production (commercial release). Likewise, the data may be segmented (as a k-fold) into multiple groups (e.g., k groups) and cycled through using each group either as testing or training. For training models without a critical mass of high quality, non-overlapping content, there may not be a holdback set.

Datasets (e.g., sets of content, including but not limited to sets of tagged records) may be partitioned in an automated way. Deep learning and automated machine learning may automatically partition the data using a strategy to find the right partitioning of data into the three or four sub datasets (training, validation, testing, and as applicable, holdback), thereby removing manual, human, or automated bias in the data. The algorithm a user chooses to build the model can be compared against others to obtain the best benefit by automatically trying and tuning parameters.

The best performing model for each level of hierarchy may be selected automatically on every retraining. Such hierarchy or taxonomy may be model-specific. The process from regeneration of a new data set to the classification of a label may be automated with the best performing combination.

The best performing model and the corresponding embedding may be selected automatically during the training, based on an $F_1$ score (harmonic mean of the precision and recall). Furthermore, to enable to an analysis of results for every target label (e.g., area/concept, signal, sub-signal) each model may provide a precision score, a recall score, and an $F_1$ score for each level.

An assembly of models may predict the sub-signal for articles (or other pieces of information) using the article's title and body. Traditional machine learning and/or deep learning may be used. Models may be saved as pickle files in a Cloud Storage Service, thereby allowing those models to be loaded as needed, e.g., to allow the training process to be split from the prediction process. Pipelines may be implemented on a client's infrastructure. For example, Python code, used for testing, may be converted to a production-ready architecture.

By way of example and not limitation, Python code may be converted using a Flask REST API or other API wrapped in a container method/protocol, such as Docker. By way of example and not limitation, Flask is a light framework for Python that offers a powerful way of annotating Python function with a RESTendpoint. REST API allows new data to be transmitted to the models and allows a prediction to be received as a response. This transmit-response protocol may allow a machine learning model to be accessible by a 3rd party business application. Docker, used in this example for illustration and not limitation, is a containerization platform which packages an application & all its dependencies into a container. It will allow the system to deploy an application on a remote server and evaluate it or run it locally without the need to install any libraries, related and unrelated dependencies, or graphical interfaces or other dependencies. Based on the load and performance requirements of the prediction or training process/processes, the instances can be spun off on demand based on the rules set up.

Different endpoints may allow a user to receive full information about currently uploaded models. For example, a /train endpoint may allow a user to retrain models with fine tuning or with previously found best parameters. A /metrics endpoint may return latest models metrics for train, test and validation subsets, thereby passing parameters for a bulk validation of an external data set. A /modelClassMetrics endpoint may return detailed metrics for each sub-signal. A /classCount may return statistic for an article dataset, which contains sub-signals and quantitative information.

The use of endpoints allows a user to control model performance and have access to the model quality metrics. Docker or other containerization method, by way of example and not limitation, is used for the deployment of trained models in production in a scalable way. These trained models may enable services and systems that work in an isolated manner. For example, data provider services may be provided to a web application.

Predictions may be made by passing a POST JSON request with title and body to the created Flask web server (e.g., on port 5000 by default), which is mapped as external port. An API may receive this request and make a prediction based on the already loaded latest models. The prediction may be returned in JSON format.

Items may be dynamically added and removed from each training set. Additionally, a fourth type of training set may be incorporated that is comprised of records that are neither classified nor assigned a specific value. For example, records may be added to a positive training set, added to a negative training set, or added to a neutral training set to help cover types of wording and text that is irrelevant to either the positive or negative training set. Training the model automatically pulls the tagged records from the system and trains any number of models using any number of data strategies to find the best precision score and the best recall score for each concept being trained, which may include themes or any other classification.

Models may take into account all combinations of the data and may be generated on every single change in the datasets. Each of these trained models are then automatically tested against the testing set and given a score. Over the course of some number of days, the best models may be retained and compared in 311, and the worst performing model(s) may be dropped. For example, within a 10 day cycle where a new model is generated each day, the worst performing model can be dropped on the 11th day and the top 10 models may be retained. This tagging of the same content by 10 different models allows performance to be distinguished across biases and wide fluctuations of the data and come to consensus on the discrimination function of automated classification of themes or other concepts in the system.

A bias may be anything that a user does not include when adding content to a training set. For example, in addition to positive categories, an "escape hatch" negative category may be added where negative examples are added. For one category, there could be a dozen sub-categories. One sub-category can have hundreds of things that are easy to find. Other categories might only have a small number of things (that occur infrequently) that are hard to find. One bias may be that a user spends too much time on finding the easy things and not the hard things, or vice versa. Another bias may be in testing. A model may be trained on a certain set of content to make it usable. For testing and validation, a user may pick out the edge cases instead of the definitions for which it was trained. This may result in a misunderstanding of the original concepts that the user set out to train the model on everything else that's not classified.

The identification of content through tagging may be the only non-automated piece. A user may tune the system based on the outcomes as a human-guided machine learning project. By way of example and not limitation, a user may take the output of a system that tracks trends in web searches and may use keyword and key phrases extraction to compare trends and discover upticks. In addition, a user may store information gathered from the web or other sources that are found in a data platform and elsewhere that corresponds to themes or other classification methods and store them as a bucket of content. A user may track groups of like and similar things and may also track risks. A user may label their own buckets of content (including but not limited to within the content that is positive or negative for a theme), add and remove things from buckets, and have an artificial intelligence (AI) agent automatically discover like content, themes or other classification using that bucket as a training set. Discovering a theme is operable to specialize the theme into one of a sub-theme, a cross-theme bucket, and a cross-theme category.

A user may see a body of records as related using their own criteria. This criteria can be named mnemonically as their own theme. As other records become visible, the user may add them to their own theme set. For every record added, either on demand per record or on regular intervals, a machine learning model may be used to classify records as to whether they are similar to others identified within the user's self-selected theme. When a record is added on demand per record, a new model may be created.

Like-instances of records may be amplified and qualify as belonging to a semantic set. Users may identify records that were improperly attributed to the user's theme, and such records may be used to eliminate other undesired records. The automated training combined with a user's individual feedback and scoring may allow a user to self-adjust their own quality and volume of records.

Instead of automatically assigning themes, the model may put records on a candidate list. That candidate list may then be reviewed record-by-record or in bulk by the user to determine which are valid candidates and should be treated at true-positives and which are not. Once a user finishes identifying a subset of records from the candidates list as true-positives or indicates that all records from the candidates list are true-positives, they can be added to the theme training set.

Additionally, a method is described herein whereby themes or other classifications may be recognized manually. A method is also described herein whereby one or more themes or other classification(s) is recognized automatically and suggested to the user as something to add to or is automatically added to the reference set/content set of themes or other applicable classification(s).

Furthermore, entity extraction may be used to identify the number of mentions of a specific entity within the theme content. Entities may be, for example, companies, industries, people and locations. Such quantitative analytics may be used to tie entities to themes. For example, the number of times the entity, IBM, is mentioned in content that is positive for the theme, cryptocurrency.

The quantitative sentiment scores on themes (or sub-themes) may be maintained and may indicate trends over time. By pulling features out of raw content, any feature may be correlated against any other feature using the whole corpus or any time-limited portion of it or other portion delimited using other criteria. Examples of features are: organizations (companies, municipalities), sentiment, signals (business growth/contraction, ESG), geography (city, county, state, country), industry/market, similarity, themes, keywords (mentions, dollar amounts, interest), time, people, and job titles. For example, having a person, job title, and company is an example of correlating three features together. Scores may be created by correlating organizations with signals and sentiment.

Subthemes may occur, for example, where you may want to have sub-themes that exclude certain keywords, concepts or phrases in order to narrow it down. Sub-themes can be user controlled, automated, key phrases, scores, etc. similar to a regular theme, including but not limited to recursively.

Figure 4:
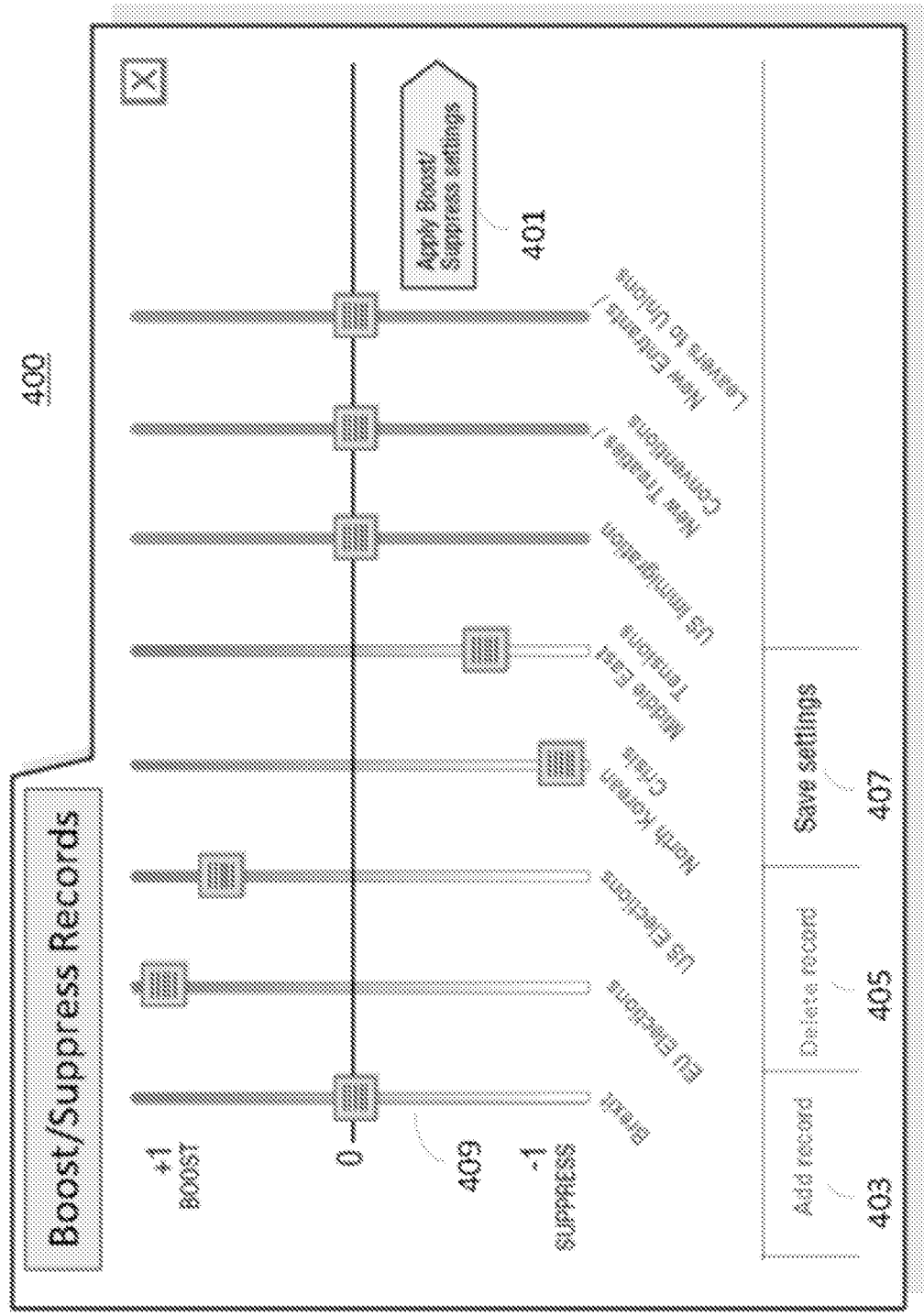
FIG. 4 illustrates an interface for applying boost and suppressing settings in an embodiment of the system.

FIG. 4 illustrates an interface 400 for applying boost and suppressing settings in an embodiment of the system. Alternatively, the interface 400 may be implemented as a set of functions and procedures (e.g., accessed via a programmatic interface/API) that allow for the creation of applications that access the features that apply boost and suppress settings. Such boosting/suppressing may or may not include, by way of example and not limitation, gradient boosting (gradient boosting trains many models in a gradual, additive and sequential manner).

The system may provide an interactive user interface 400 for identifying and amplifying records belonging to the semantic set from the candidates list as true-positives. A boost button may appear on any display and may bring up a pop-up control panel or temporarily open an additional view where the user can boost certain records. When selected by the user, a control panel may appear such as the panel shown in FIG. 4. The boost/suppress control panel may appear with records already selected by the user for the current display.

The user may add new records (via button 403), delete records (via button 405), and save settings (via button 407). The control panel equalizer sliders 409 may be used to boost or suppress the selected records. For example, the user has elected to boost the records of "EU elections" to +1 and to suppress the records of "North Korean Crisis" to −1.

After slider settings are selected, the user may choose with button 401 to apply the booster settings to the current display. One impact of the boost/suppress control panel is the ranking of records in various views based on the boost selected. This allows the system-selected records to be combined with the user-selected records to generate a single composite list on the fly without changing the search query.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for data analysis, the method comprising: partitioning, via a processor, a plurality of records into a plurality of tagged sets, wherein the plurality of tagged sets comprises a positive set, a negative set, and a neutral set; generating, via a user interface, a model according to a first portion of the plurality of tagged sets, wherein: the user interface comprises one or more records that are selectively weighted according to one or more associated boost settings or suppress settings, the user interface comprises a control panel with a first button configured to add new records, a second button configured to delete records, and a plurality of equalizer sliders configured to boost or suppress each of a plurality of selected records, and the user interface is implemented as a set of functions and procedures accessed via a programmatic interface that allows for the creation of applications that access the features that apply boost and suppress settings; evaluating, via the processor, an initial fit of the model according to a second portion of the plurality of tagged sets; adjusting, via the user interface, the model according to the initial fit of the model; and evaluating, via the processor, a final fit of the adjusted model according to a third portion of the plurality of tagged sets; the adjusted model to determine a single combined score that differentiates inclusion versus exclusion on a scale of scores related to a theme, the plurality of equalizer sliders are configured to provide the scale of scores related to the theme by boosting or suppressing each of the plurality of selected records associated with the theme, the single combined score is an amount of records identified according to the tradeoff of precision and recall, precision is based on false positives, recall is based on missing positives, and the single combined score is determined according to a precision score and a recall score, the adjusted model is retained for inclusion based on the adjusted model being classified as a best performing model according to the single combined score.

2. The method of claim 1, wherein the method comprises scoring the adjusted model according to a fourth portion of the plurality of tagged sets.

3. The method of claim 2, wherein the method comprises comparing a score of the adjusted model to a score of a different model.

4. The method of claim 3, wherein the method comprises retaining a better-scoring model according to the comparison.

5. The method of claim 3, wherein the method comprises dropping a worse-scoring model according to the comparison.

6. The method of claim 1, wherein the method comprises discovering an uptick over time in the single combined score related to the theme.

7. The method of claim 1, wherein the method comprises extracting a key phrase from an article of content associated with the theme, wherein a number of occurrences of the key phrase exceeds a threshold, and wherein the key phrase comprises one or more words.

8. The method of claim 7, wherein the method comprises comparing the extracted key phrase to the positive set.

9. The method of claim 7, wherein the method comprises adding the extracted key phrase to the positive set.

10. A system for data analysis, the system comprising: a user interface comprising a control panel with a first button configured to add new records, a second button configured to delete records, and a plurality of equalizer sliders configured to boost or suppress each of a plurality of selected records, wherein the user interface is implemented as a set of functions and procedures accessed via a programmatic interface that allows for the creation of applications that access the features that apply boost and suppress settings; and a non-transitory computer readable medium having stored thereon software instructions, wherein, when performed by a processor, the software instructions are operable to: partition a plurality of records into a plurality of tagged sets, wherein the plurality of tagged sets comprises a positive set, a negative set, and a neutral set; generate a model, as specified via the user interface, according to a first portion of the plurality of tagged sets, wherein the user interface comprises one or more records that are selectively weighted according to one or more associated boost/suppress settings; evaluate an initial fit of the model according to a second portion of the plurality of tagged sets; adjust the model, as specified via the user interface, according to the initial fit of the model; and evaluate a final fit of the adjusted model according to a third portion of the plurality of tagged sets; wherein: the software instructions are operable to use the adjusted model to determine a single combined score related to a theme, the plurality of equalizer sliders are configured to scale selected records associated with the theme, the single combined score is an amount of records identified according to the tradeoff of precision and recall, precision is based on false positives, recall is based on missing positives, and the single combined score is determined according to a precision score and a recall score.

11. The system of claim 10, wherein the software instructions are operable to score the adjusted model according to a fourth portion of the plurality of tagged sets.

12. The system of claim 11, wherein the software instructions are operable to compare a score of the adjusted model to a score of a different model.

13. The system of claim 12, wherein the software instructions are operable to retain a better-scoring model according to the comparison.

14. The system of claim 12, wherein the software instructions are operable to drop a worse-scoring model according to the comparison.

15. The system of claim 10, wherein the software instructions are operable to discover an uptick over time in the single combined score related to the theme.

16. The system of claim 10, wherein the software instructions are operable to extract a key phrase from an article of content associated with the theme, wherein a number of occurrences of the key phrase exceeds a threshold, and wherein the key phrase comprises one or more words.

17. The system of claim 16, wherein the software instructions are operable to compare the extracted key phrase to the positive set.

18. The system of claim 16, wherein the software instructions are operable to add the extracted key phrase to the positive set.

* * * * *